US012633101B2

(12) United States Patent
Hosomi et al.

(10) Patent No.: US 12,633,101 B2
(45) Date of Patent: May 19, 2026

(54) INFORMATION PROCESSING APPARATUS, INFORMATION PROCESSING METHOD, LEARNING METHOD AND MOVING OBJECT FOR PREDICTING A REGION IN AN IMAGE CORRESPONDING TO UTTERANCE

(71) Applicants: HONDA MOTOR CO., LTD., Tokyo (JP); KEIO UNIVERSITY, Tokyo (JP)

(72) Inventors: Naoki Hosomi, Wako (JP); Teruhisa Misu, San Jose, CA (US); Shumpei Hatanaka, Yokohama (JP); Wei Yang, Yokohama (JP); Komei Sugiura, Yokohama (JP)

(73) Assignees: HONDA MOTOR CO., LTD., Tokyo (JP); KEIO UNIVERSITY, Tokyo (JP)

( * ) Notice: Subject to any disclaimer, the term of this patent is extended or adjusted under 35 U.S.C. 154(b) by 341 days.

(21) Appl. No.: 18/198,680

(22) Filed: May 17, 2023

(65) Prior Publication Data

US 2024/0386711 A1      Nov. 21, 2024

(51) Int. Cl.
*G06V 10/80*          (2022.01)
*G06T 7/11*           (2017.01)
(Continued)

(52) U.S. Cl.
CPC .............. *G06V 10/806* (2022.01); *G06T 7/11* (2017.01); *G06V 10/764* (2022.01);
(Continued)

(58) Field of Classification Search
CPC ............... G06V 10/806; G06V 10/764; G06V 10/7715; G06V 10/774; G06V 10/82;
(Continued)

(56) References Cited

U.S. PATENT DOCUMENTS 11,151,406 B2    10/2021  Huang et al.
2024/0142995 A1   5/2024  Toyoshi et al.

FOREIGN PATENT DOCUMENTS

JP        2019216442 A  * 12/2019
JP        2020-032844 A    3/2020
(Continued)

OTHER PUBLICATIONS

Liu et al., RoBERTa: A Robustly Optimized BERT Pretraining Approach, Jul. 26, 2019, Paul G. Allen School of Computer Science & Engineering, University of Washington, Seattle, WA, https://arxiv.org/abs/1907.11692v1.

(Continued)

*Primary Examiner* — Charlotte M Baker
(74) *Attorney, Agent, or Firm* — THOMAS | HORSTEMEYER, LLP

(57)          ABSTRACT

An information processing apparatus in embodiments performs at least one trained machine learning model that includes an encoder and a decoder. The encoder receives inputs of text information including designation of a place, a first image that is an image captured by an image capturing apparatus and that includes the place, and a second image obtained by dividing a region for every identical object in the first image, and outputs tri-modal features that have been generated to include visual features of the first image that has been captured, visual features of the second image obtained by dividing the region, and language features of the text information. The decoder outputs a region on the first image corresponding to the designation of the place in the text information, by using the tri-modal features.

18 Claims, 9 Drawing Sheets

(51) Int. Cl.

| | |
|---|---|
| *G06V 10/764* | (2022.01) |
| *G06V 10/77* | (2022.01) |
| *G06V 10/774* | (2022.01) |
| *G06V 10/82* | (2022.01) |
| *G06V 10/94* | (2022.01) |
| *G06V 20/70* | (2022.01) |
| *G10L 15/02* | (2006.01) |
| *G10L 15/16* | (2006.01) |
| *G10L 15/22* | (2006.01) |

(52) U.S. Cl.
CPC ........ *G06V 10/7715* (2022.01); *G06V 10/774* (2022.01); *G06V 10/82* (2022.01); *G06V 10/945* (2022.01); *G06V 20/70* (2022.01); *G10L 15/02* (2013.01); *G10L 15/16* (2013.01); *G10L 15/22* (2013.01); *G06T 2207/20021* (2013.01); *G06T 2207/20081* (2013.01); *G06T 2207/20084* (2013.01); *G06T 2207/20092* (2013.01); *G06T 2207/30252* (2013.01)

(58) Field of Classification Search
CPC ........ G06V 10/945; G06V 20/70; G06T 7/11; G06T 2207/20021; G06T 2207/20081; G06T 2207/20084; G06T 2207/20092; G06T 2207/30252; G10L 15/02; G10L 15/16; G10L 15/22; G06F 18/253; G06F 18/256
USPC ........................................................ 382/103
See application file for complete search history.

(56) References Cited

FOREIGN PATENT DOCUMENTS

| | | | | | |
|---|---|---|---|---|---|
| JP | 2020054651 A | * | 4/2020 | ......... | G07C 9/00896 |
| JP | 2020-135852 A | | 8/2020 | | |
| JP | 2020-190930 A | | 11/2020 | | |
| WO | 2022/181130 A1 | | 9/2022 | | |

OTHER PUBLICATIONS

Cheng et al., Masked-attention Mask Transformer for Universal Image Segmentation, CVPR 2022, https://bowenc0221.github.io/mask2former/.

Yang et al., LAVT: Language-Aware Vision Transformer for Referring Image Segmentation, pp. 18155-18165, https://ppenaccess.thecvf.com/content/CVPR2022/papers/Yang_LAVT_Language-Aware_Vision_Transformer_for_Referring_Image_Segmentation_CVPR_2022_paper.pdf.

Liu et al., Swin Transformer: Hierarchical Vision Transformer using Shifted Windows, pp. 10012-10022, https://openaccess.thecvf.com/content/ICCV2021/papers/Liu_Swin_Transformer_Hierarchical_Vision_Transformer_Using_Shifted_Windows_ICCV_2021_paper.pdf.

International Search Report and Written Opinion for PCT/JP2024/018220 mailed Jul. 30, 2024.

* cited by examiner

F I G.  1A
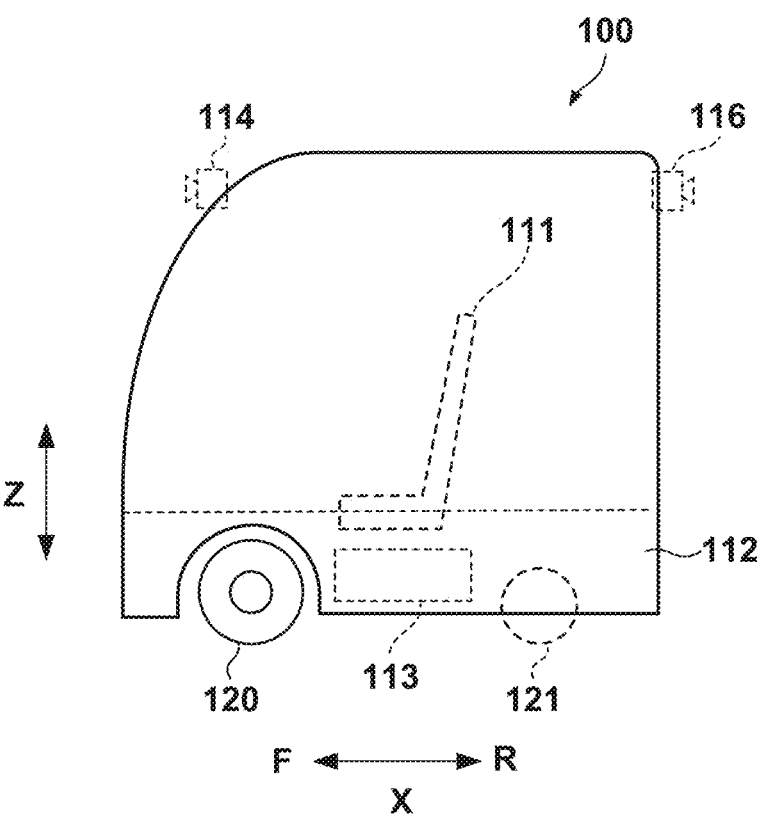
F I G.  1B
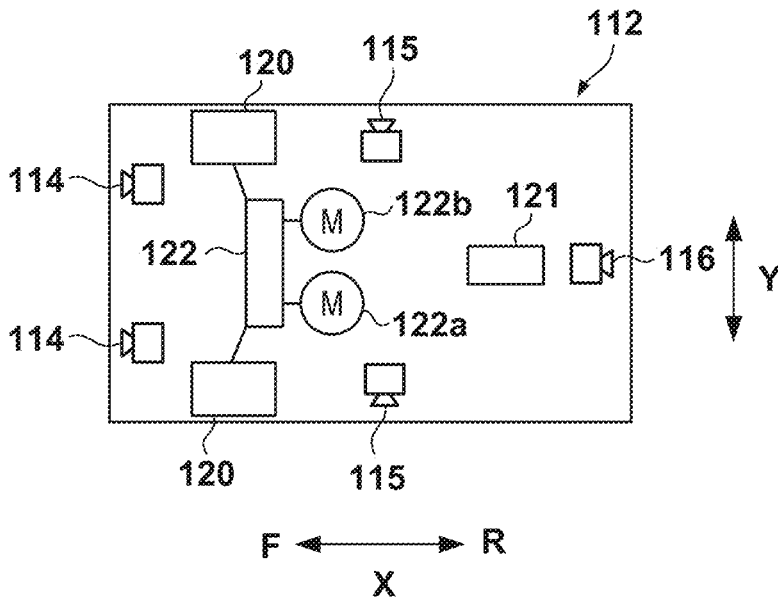

Figure 3:
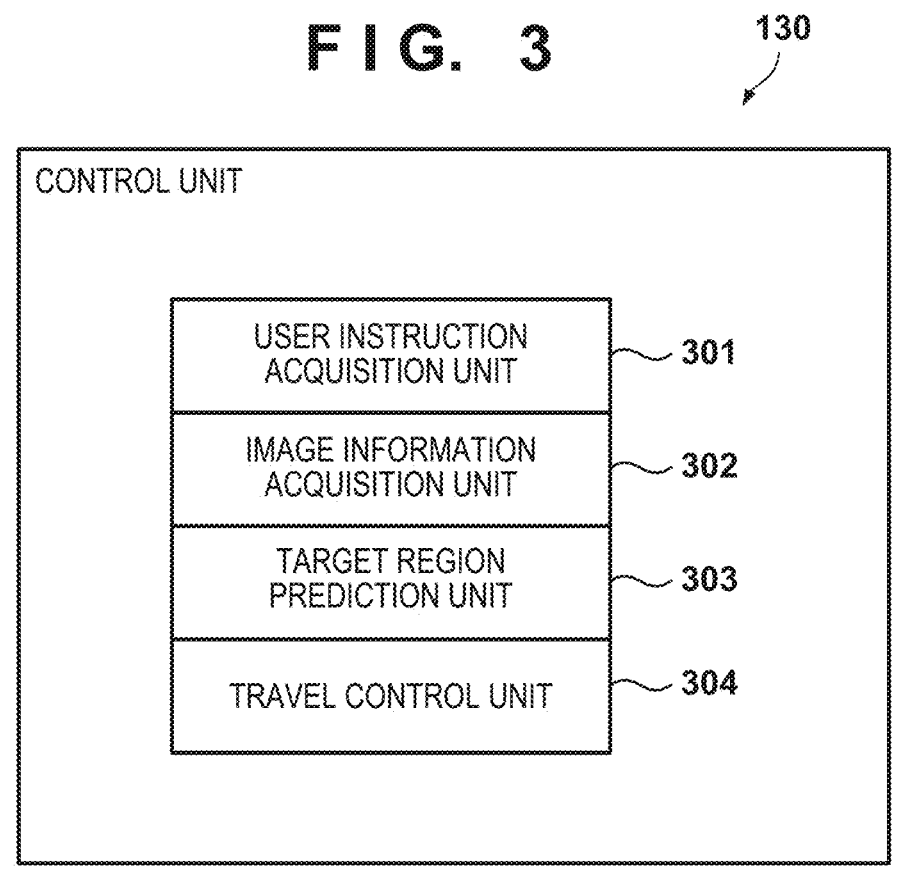

CONTROL UNIT

| | |
|---|---|
| USER INSTRUCTION ACQUISITION UNIT | 301 |
| IMAGE INFORMATION ACQUISITION UNIT | 302 |
| TARGET REGION PREDICTION UNIT | 303 |
| TRAVEL CONTROL UNIT | 304 |

F I G.  7A
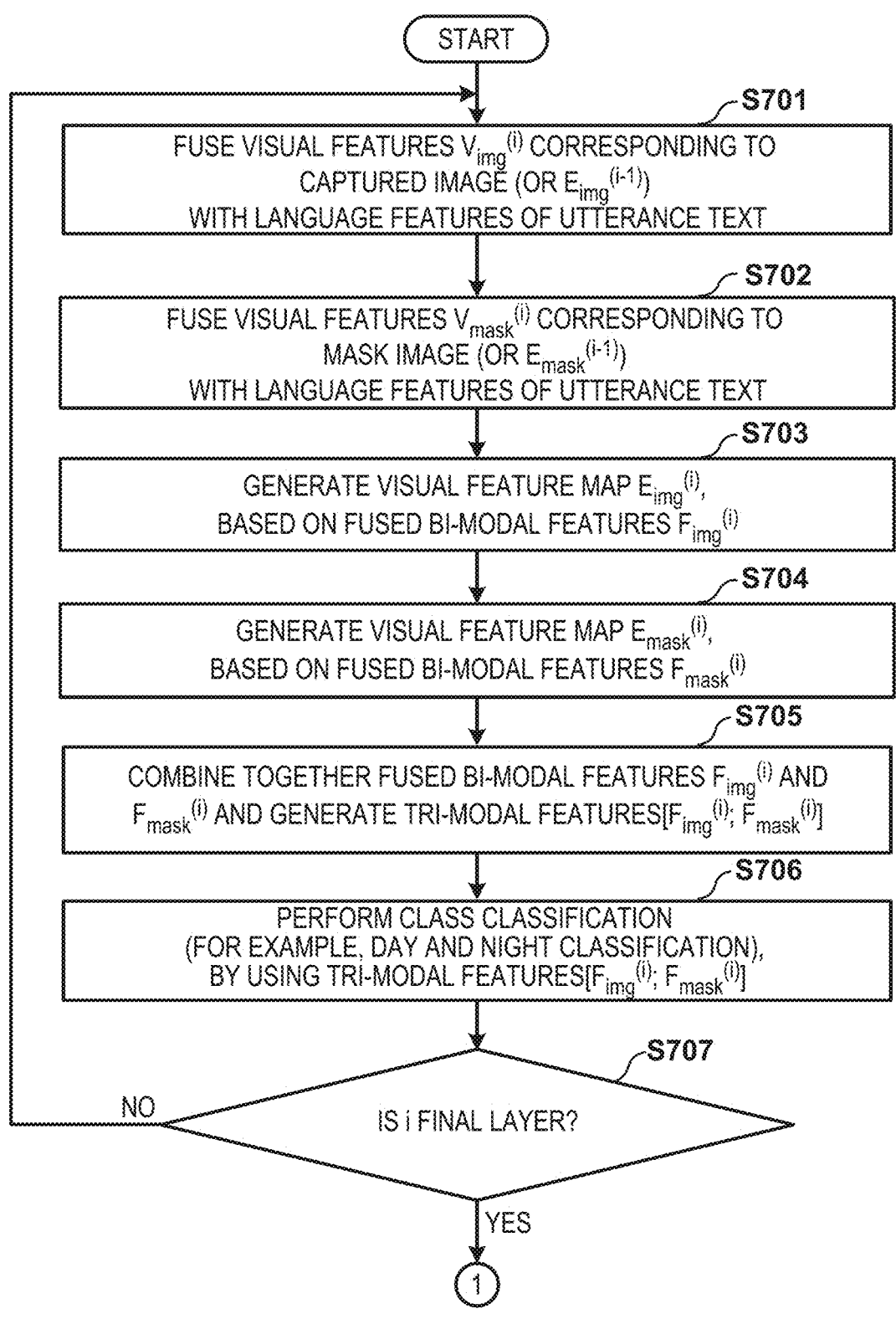

F I G. 7B

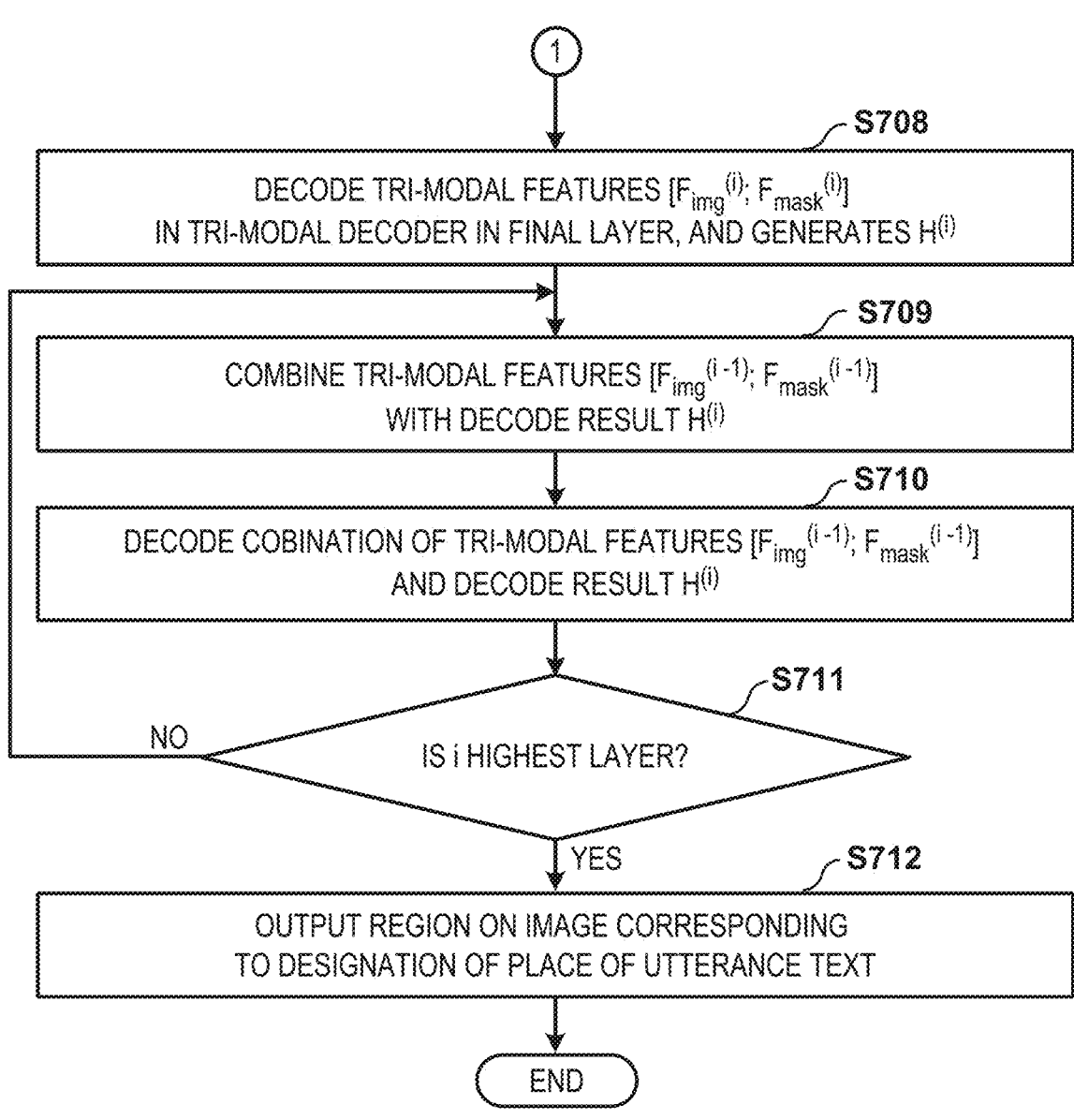

①

S708
DECODE TRI-MODAL FEATURES $[F_{img}^{(i)}; F_{mask}^{(i)}]$
IN TRI-MODAL DECODER IN FINAL LAYER, AND GENERATES $H^{(i)}$ S709
COMBINE TRI-MODAL FEATURES $[F_{img}^{(i-1)}; F_{mask}^{(i-1)}]$
WITH DECODE RESULT $H^{(i)}$ S710
DECODE COBINATION OF TRI-MODAL FEATURES $[F_{img}^{(i-1)}; F_{mask}^{(i-1)}]$
AND DECODE RESULT $H^{(i)}$ S711
IS i HIGHEST LAYER?

NO

YES S712

OUTPUT REGION ON IMAGE CORRESPONDING
TO DESIGNATION OF PLACE OF UTTERANCE TEXT

END

F I G. 8
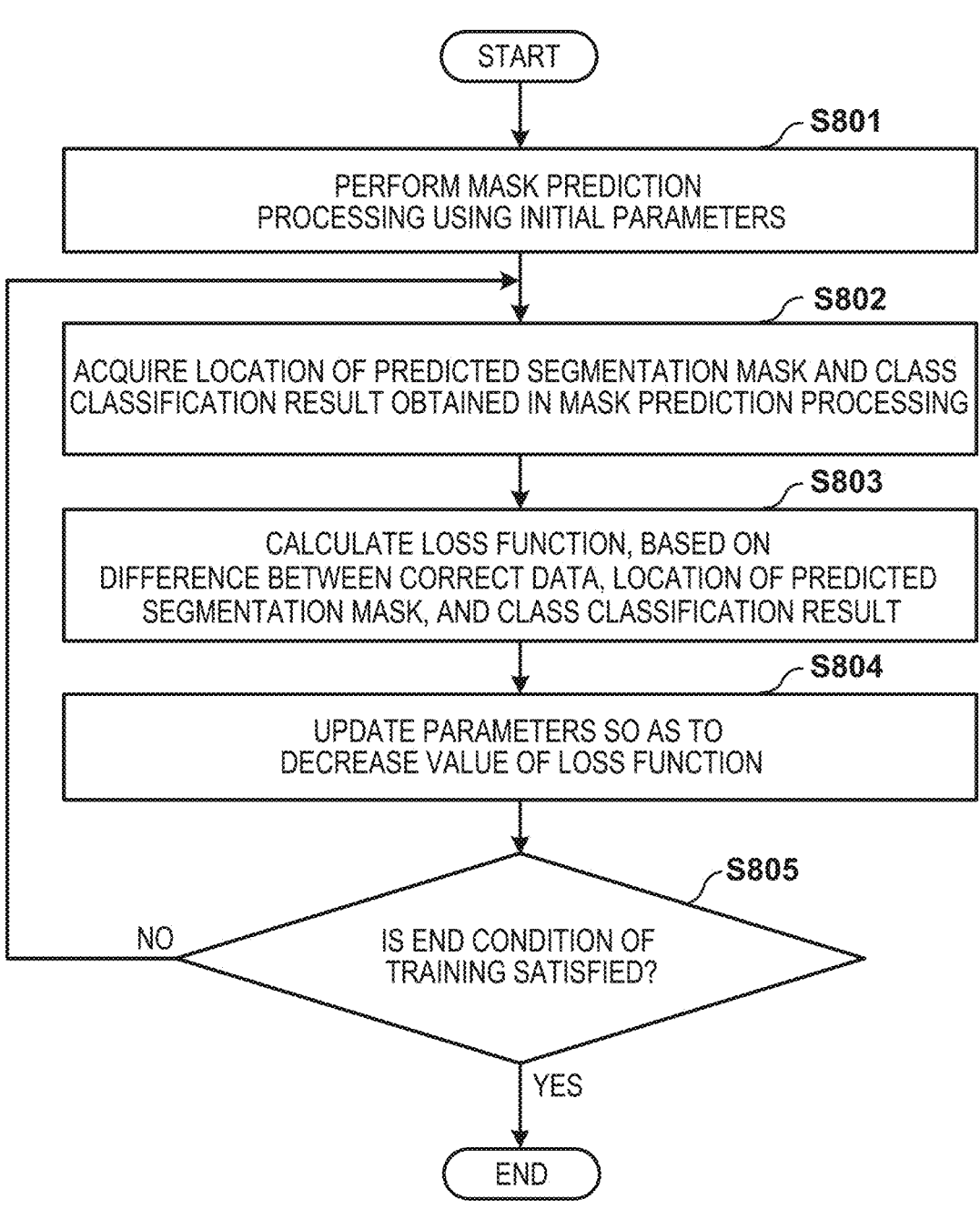

INFORMATION PROCESSING APPARATUS, INFORMATION PROCESSING METHOD, LEARNING METHOD AND MOVING OBJECT FOR PREDICTING A REGION IN AN IMAGE CORRESPONDING TO UTTERANCE

BACKGROUND OF THE INVENTION

Field of the Invention

The present invention relates to an information processing apparatus, an information processing method, a learning method, and a moving object for predicting a region in an image corresponding to utterance.

Description of the Related Art

In these years, there is an increasing demand for ultra-compact moving objects (micro mobility vehicles) for supporting movements of people in small regions. Micro mobility vehicles include vehicles each having a riding capacity of one person or so, vehicles that travel carrying baggage along with a person, instead of carrying the person, and the like, and necessitates autonomous movement technology for such purposes.

Japanese Patent Application Laid-Open No. 2020-32844 discloses a system that classifies objects using sensor data including point group data from a LiDAR subsystem and image data from a camera subsystem, and conducts full- or semi-automatic driving using classification results.

In using a moving object, there is a demand for a technique for appropriately identifying the designated place by using the utterance and image data in a case where a person designates by utterance a place where the moving object should stop. Regarding the technique described in Japanese Patent Application Laid-Open No. 2020-32844, a technique for classifying objects by using point group data and image data is disclosed. However, no consideration is given to receiving an instruction by utterance made by a person and identifying the designated place in an image.

SUMMARY OF THE INVENTION

The present invention has been made in view of the above circumstances, and has been made to achieve a technique capable of appropriately identifying a place that is included in an image and that is related to utterance.

According to the present invention, an information processing apparatus comprising at least one processor configured to perform at least one trained machine learning model is provided, wherein the at least one trained machine learning model includes: an encoder configured to receive inputs of text information including designation of a place, a first image that is an image captured by an image capturing apparatus and that includes the place, and a second image obtained by dividing a region for every identical object in the first image, and configured to output tri-modal features that have been generated to include visual features of the first image that has been captured, visual features of the second image obtained by dividing the region, and language features of the text information; and a decoder configured to output a region on the first image corresponding to the designation of the place in the text information, by using the tri-modal features.

According to the present invention, a learning method performed by an information processing apparatus for training at least one machine learning model to generate at least one trained machine learning model is provided, wherein the at least one machine learning model each includes a neural network, and the at least one machine learning model includes: an encoder configured to receive inputs of text information including designation of a place, a first image that is an image captured by an image capturing apparatus and that includes the place, and a second image obtained by dividing a region for every identical object in the first image, configured to generate bi-modal features corresponding to each image in which language features of the text information are fused with visual features of each image by use of an attention mechanism, and configured to output tri-modal features in which the bi-modal features that have been generated are combined together; and a decoder configured to output a region on the first image corresponding to the designation of the place in the text information, by using either the tri-modal features or the bi-modal features corresponding to each image, the learning method comprising changing a weighting parameter of the neural network to reduce a value of a loss function using a loss with use of an output from the decoder and a correct answer indicating the region on the first image.

According to the present invention, a moving object comprising: an image capturing apparatus; an acquisition unit configured to acquire text information; and at least one processor configured to perform processing of at least one trained machine learning model is provided, wherein the at least one trained machine learning model includes: an encoder configured to receive inputs of text information including designation of a place, a first image that is an image captured by the image capturing apparatus and that includes the place, and a second image obtained by dividing a region for every identical object in the first image, and configured to output tri-modal features that have been generated to include visual features of the first image that has been captured, visual features of the second image obtained by dividing the region, and language features of the text information; and a decoder configured to output a region on the first image corresponding to the designation of the place in the text information, by using the tri-modal features.

According to the present invention, an information processing method performed by an information processing apparatus for performing at least one trained machine learning model is provided, the information processing method comprising: receiving inputs of text information including designation of a place, a first image that is an image captured by an image capturing apparatus and that includes the place, and a second image obtained by dividing a region for every identical object in the first image, and encoding tri-modal features that have been generated to include visual features of the first image that has been captured, visual features of the second image obtained by dividing the region, and language features of the text information; and decoding a region on the first image corresponding to the designation of the place in the text information, by using the tri-modal features.

According to the invention, it is capable of appropriately identifying a place that is included in an image and that is related to utterance.

BRIEF DESCRIPTION OF THE DRAWINGS

FIG. 1A is a diagram (1) illustrating a configuration example of a moving object according to an embodiment;

FIG. 1B is a diagram (2) illustrating a configuration example of the moving object according to an embodiment;

FIG. 3 is a block diagram illustrating a functional configuration example related to a control unit of the moving object according to an embodiment;

FIG. 7A is a flowchart (1) illustrating a series of operations of the mask prediction processing according to an embodiment;

FIG. 7B is a flowchart (2) illustrating a series of operations of the mask prediction processing according to an embodiment; and FIG. 8 is a flowchart illustrating a series of operations of processing of training a model according to an embodiment.

DESCRIPTION OF THE EMBODIMENTS

Figure 2:
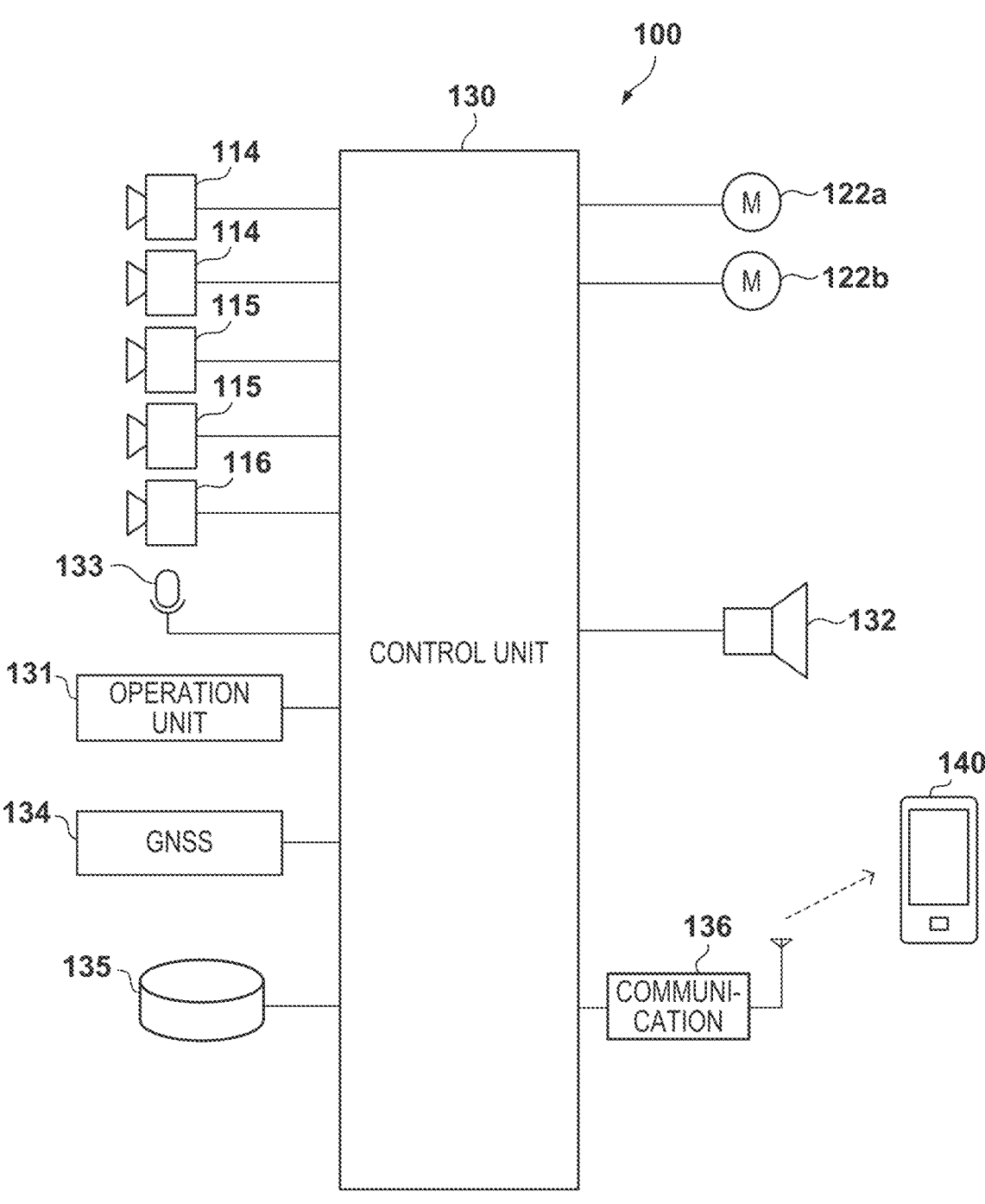
FIG. 2 is a block diagram illustrating a configuration example of a control system of the moving object according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

In following embodiments, a case where a model of a neural network as a machine learning model to be described later is performed in a micro mobility vehicle that is an example of an information processing apparatus will be described as an example. However, the machine learning model according to the present embodiment is not limited to a moving object such as a micro mobility vehicle, and may be performed by an information processing server on a cloud that is another example of the information processing apparatus. In addition, the machine learning model according to the present embodiment may be performed by another electronic device capable of acquiring a captured image and utterance that is still another example of the information processing apparatus.

Further, in the following embodiments, as an example of the moving object that is the micro mobility vehicle, an ultra-compact electric vehicle having a riding capacity of one person or so will be described as an example. However, the micro mobility vehicles may include any vehicle that travels carrying baggage along with a person, instead of carrying the person. In addition, the present embodiment is not limited to the example in which the moving object is an electric vehicle, and is applicable to any moving object other than the electric vehicle.

The moving object such as the micro mobility vehicle as described above does not always travel on a specific determined route. Further, the moving object has to travel in a region where a highly accurate map is not prepared in order to be capable of traveling in both moving regions of vehicles and moving regions of pedestrians. Hence, a moving object 100 according to the present embodiment recognizes a traveling region, generates a route by using an image captured by the moving object itself, and autonomously travels in accordance with the generated route, without using the highly accurate map. In this situation, the moving object 100 according to the present embodiment, for example, performs a machine learning model that appropriately predicts a region on an image corresponding to a place designated by utterance in order to appropriately move to the place designated by the user by the utterance.

Configuration of Moving Object

A configuration of the moving object 100 will be described with reference to FIGS. 1A and 1B. FIG. 1A illustrates a side surface of the moving object 100 according to the present embodiment, and FIG. 1B illustrates an internal configuration of the moving object 100. In the drawing, an arrow X indicates a front-and-rear direction of the moving object 100, and F indicates the front, and R indicates the rear. Arrows Y and Z respectively indicate a width direction (a left-and-right direction) and an up-and-down direction of the moving object 100.

The moving object 100 is an electric autonomous vehicle including a traveling unit 112 and using a battery 113 as a main power supply. The battery 113 is, for example, a secondary battery such as a lithium ion battery, and the moving object 100 autonomously travels on the traveling unit 112 with electric power supplied from the battery 113. The traveling unit 112 includes a pair of left and right drive wheels 120, which are front wheels, and one driven wheel 121, which is a rear wheel. Note that the traveling unit 112 may have another form such as a form of a four-wheeled vehicle. In addition, the rear wheel is not limited to the driven wheel, and may be driven by a drive mechanism. The moving object 100 includes, for example, a single seat 111.

The traveling unit 112 includes a drive mechanism 122. The drive mechanism 122 is a mechanism that rotates the corresponding drive wheels 120 with motors 122*a* and 122*b* as drive sources. By rotating each of the drive wheels 120, the drive mechanism 122 is capable of moving the moving object 100 forward or backward. By making a difference in rotation between the motors 122*a* and 122*b*, the drive mechanism 122 is also capable of changing an advancing direction of the moving object 100. The traveling unit 112 includes the driven wheel 121. The driven wheel is capable of making a turn with Z direction as a rotation axis.

The moving object 100 includes detection units 114 to 116, each of which detects a target object in the surroundings of the moving object 100. The detection units 114 to 116 are an external sensor group that monitors the periphery of the moving object 100. In the case of the present embodiment, each of the detection units 114 to 116 is an image capturing apparatus that captures an image in the surroundings of the moving object 100, and includes, for example, an optical system such as a lens and an image sensor. However, in addition to the image capturing apparatus, a radar or a light detection and ranging (LiDAR) may be adopted.

For example, two detection units 114 are disposed in a front portion of the moving object 100 to be spaced apart from each other in Y direction, and are mainly used for acquiring captured images of a forward side of the moving object 100. Note that the detection unit 114 may include one image capturing apparatus. The detection units 115 are respectively disposed on a left lateral side portion and a right lateral side portion of the moving object 100, and are mainly used for acquiring captured image on lateral sides of the moving object 100. The detection unit 116 is disposed in a rear portion of the moving object 100, and is mainly used for acquiring a captured image on a backward side of the moving object 100. Note that the moving object 100 does not have to include the detection unit 115 or 116.

FIG. 2 is a block diagram of a control system of the moving object 100. The moving object 100 includes a control unit (ECU) 130. The control unit 130 includes one or more processors including a CPU or a GPU, a memory device of a semiconductor memory or the like, an interface with an external device, and the like. The memory device stores a program to be executed by the processor and various types of data (for example, weighting parameters of a trained model) for use in processing performed by the processor. A plurality of sets of the processor, the memory device, and the interface may be provided for an individual function of the moving object 100 to be capable of communicating with each other.

The control unit 130 acquires outputs (for example, image information) from the detection units 114 to 116, input information into an operation unit 131, voice information that has been input from a voice input device 133, and the like, and performs various types of processing. The control unit 130 conducts, for example, control of the motors 122a and 122b (travel control of the traveling unit 112) and display control of a display panel included in the operation unit 131, gives a notification to an occupant of the moving object 100 by sounds, and outputs information. In addition, as will be described later, by using an output (for example, image information) from the detection unit 114 and sound information, the control unit 130 performs processing (mask prediction processing) of predicting a region in an image corresponding to a place designated by a user. The mask prediction processing is performed by use of a machine learning model (for example, a deep neural network).

The voice input device 133 includes, for example, a microphone, and collects voices of an occupant (user) of the moving object 100. A global navigation satellite system (GNSS) sensor 134 receives a GNSS signal, and detects a current location of the moving object 100.

A storage device 135 includes a nonvolatile recording medium that stores various pieces of data. The storage device 135 may also store a program to be executed by the processor, data for use in processing by the processor, and the like. The storage device 135 may store various parameters (for example, trained weighting parameters or hyperparameters of a deep neural network, or the like) of the machine learning model performed by the control unit 130.

A communication device 136 is a communication device capable of communicating with an external device (for example, a communication terminal 140 owned by the user) via wireless communication, such as Wi-Fi or 5th generation mobile communication.

Next, a functional configuration example according to the control unit 130 will be described with reference to FIG. 3. A user instruction acquisition unit 301 acquires a user instruction to be input via the operation unit 131 or the voice input device 133. The user instruction may be converted into utterance text by voice recognition, or may be input as text. The user instruction includes, for example, designation of a place at which the moving object 100 should arrive. In addition, the user instruction may include a change instruction for traveling, such as a right turn or a left turn, while the moving object 100 is traveling. An image information acquisition unit 302 acquires outputs (for example, image information) from the detection units 114 to 116.

A target region prediction unit 303 performs mask prediction processing, by using utterance for designating the place from the user instruction acquisition unit 301 and the image information from the image information acquisition unit 302. The target region prediction unit 303 performs the mask prediction processing, by performing a machine learning model to be described later.

Note that the control unit 130 may perform processing of recognizing the location and the shape of an obstacle, a traveling region, and the like, by using the image information, in addition to the processing performed by the target region prediction unit 303. The location and the shape of the obstacle, and the traveling region, a road structure, and the like on a forward side of the moving object 100 may be recognized by, for example, applying a pre-trained machine learning model for image recognition (which is different from the model for use in the mask prediction processing) to the images obtained from the two detection units 114. In addition, estimation of a depth from the moving object 100 with the images obtained from the two detection units 114 used as stereo images may be included.

A travel control unit 304 determines a travel route to a designated place, based on the region in the image corresponding to the instruction that has been predicted by the target region prediction unit 303 and the traveling region that has been recognized by use of the image information, and determines a control amount of the moving object in accordance with the traveling route that has been determined. Determining the traveling route with a region in an image as a target location can be performed in any method, and a known method may be used. The travel control unit 304 further controls the traveling of the moving object 100 (for example, controls the motors 122a and 122b) in accordance with the control amount that has been determined.

Configuration of Model for Use in Mask Prediction Processing

Figure 4:
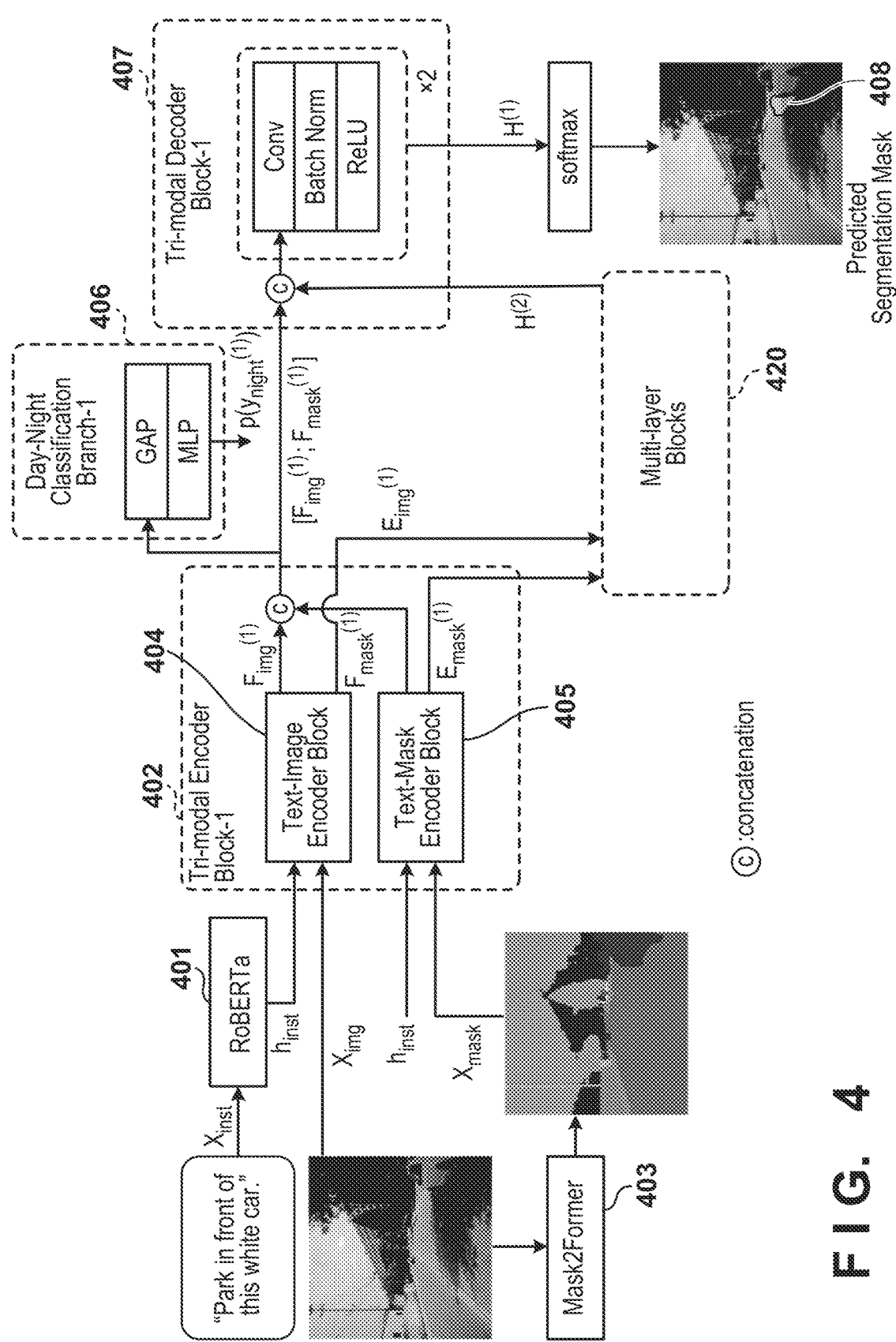
FIG. 4 is a diagram illustrating a configuration example of a model (a machine learning model) of a neural network for use in mask prediction processing according to an embodiment.

Referring to FIG. 4, a configuration example of a model of a neural network (The machine learning model. Simply referred to as a learning model) for use in mask prediction processing will be described.

A ROBERTa module 401 receives an input of utterance text, and extracts features (language features $h_{inst}$) of the utterance text. The utterance text is, for example, "Park in front of this white car", and includes utterance for designating a place on a forward side of a white vehicle included in a captured image $X_{img}$. The ROBERTa module 401 extracts language features, by using, for example, a BERT model that has been trained in a known method proposed as ROBERTa. Note that in the present embodiment, a case of using the method proposed as ROBERTa ("ROBERTa: A Robustly Optimized BERT Pretraining Approach" (https://arxiv.org/abs/1907.11692v1)) is described as an example. However, the language features may be extracted by use of another BERT model that has been trained in another method or another model. Note that in the present embodiment, a case where the utterance text is input is described as an example. However, the text that has been input by the user may be input into the ROBERTa module 401.

A Mask2Former module 403 receives an input of the captured image $X_{img}$, and generates a semantic segmentation mask image $X_{mask}$ (simply referred to as a mask image) in which a region is divided for every identical object in the image. The Mask2Former module 403 is capable of generating a mask image (zero-shot generation) using the pre-trained model without performing fine tuning for the present mask prediction processing. For the generation of the mask image, it is possible to use, for example, a known model ("Masked-attention Mask Transformer for Universal Image Segmentation" (https://bowenc0221.github.io/mask2 former/)) proposed as Mask2Former, without being limited to this. In the generation of the mask image $X_{mask}$ according to the present embodiment, a case where the type of the divided region (for example, a road, sky, a vehicle, or the like) is identifiable will be described as an example. However, the present embodiment is also applicable to a case where the type of the region is not identified for a part or all of the regions.

A tri-modal encoder block 402 receives inputs of the captured image $X_{img}$, the language features $h_{inst}$, and the mask image $X_{mask}$, and generates tri-modal features ([$F_{img}$; $F_{mask}$]) including these three modal features. The tri-modal encoder block may be configured in a plurality of layers in order to handle multi-scale visual features in which spatial sizes are reduced in a stepwise manner. The configuration of the tri-modal encoder block, which is a lower later than the tri-modal encoder block 402, is included in multi-layer blocks 420. The multi-layer blocks 420 will be described later with reference to FIG. 6.

The tri-modal encoder block 402 includes a text-image encoder block 404, and a text-mask encoder block 405. By using an attention mechanism, the text-image encoder block 404 generates multi-modal features (the bi-modal features $F_{img}$) corresponding to the captured image in which the language features $h_{inst}$ of the utterance text are fused with the visual features of the captured image $X_{img}$. Note that in the following description, in order to distinguish from the tri-modal features, features in which two modal features of the visual features and the language features are fused together will be referred to as bi-modal features. In addition, by using the attention mechanism, the text-mask encoder block 405 generates multi-modal features (the bi-modal features $F_{mask}$) corresponding to the mask image in which the language features $h_{inst}$ of the utterance text are fused with the visual features of the mask image $X_{mask}$.

Further, the text-image encoder block 404 outputs a visual feature map $E_{img}$ in which the bi-modal features $F_{img}$ corresponding to the captured image are merged with the visual features $V_{img}$ of the captured image. Furthermore, the text-mask encoder block 405 outputs a visual feature map $E_{mask}$ in which the bi-modal features $F_{mask}$ corresponding to the mask image are merged with the visual features $V_{mask}$ of the mask image.

The tri-modal encoder block 402 outputs tri-modal features [$F_{img}$; $F_{mask}$] in which the bi-modal features $F_{img}$ corresponding to the captured image and the bi-modal features $F_{mask}$ corresponding to the mask image are combined together by coupling (concatenating) them. Note that the tri-modal encoder block 402 may output tri-modal features in which the bi-modal features $F_{img}$ corresponding to the captured image and the bi-modal features $F_{mask}$ corresponding to the mask image are combined together by adding them for every matrix element.

In this manner, in the present embodiment, the text-mask encoder block 405 is provided in the tri-modal encoder block 402 to generate the bi-modal features of the text-mask encoder block 405. In addition, the tri-modal encoder block 402 generates the tri-modal features including features related to the mask image. Accordingly, in addition to the visual features and the language features, it is possible to use the multi-modal features including the features of the segmentation mask.

Figure 5:
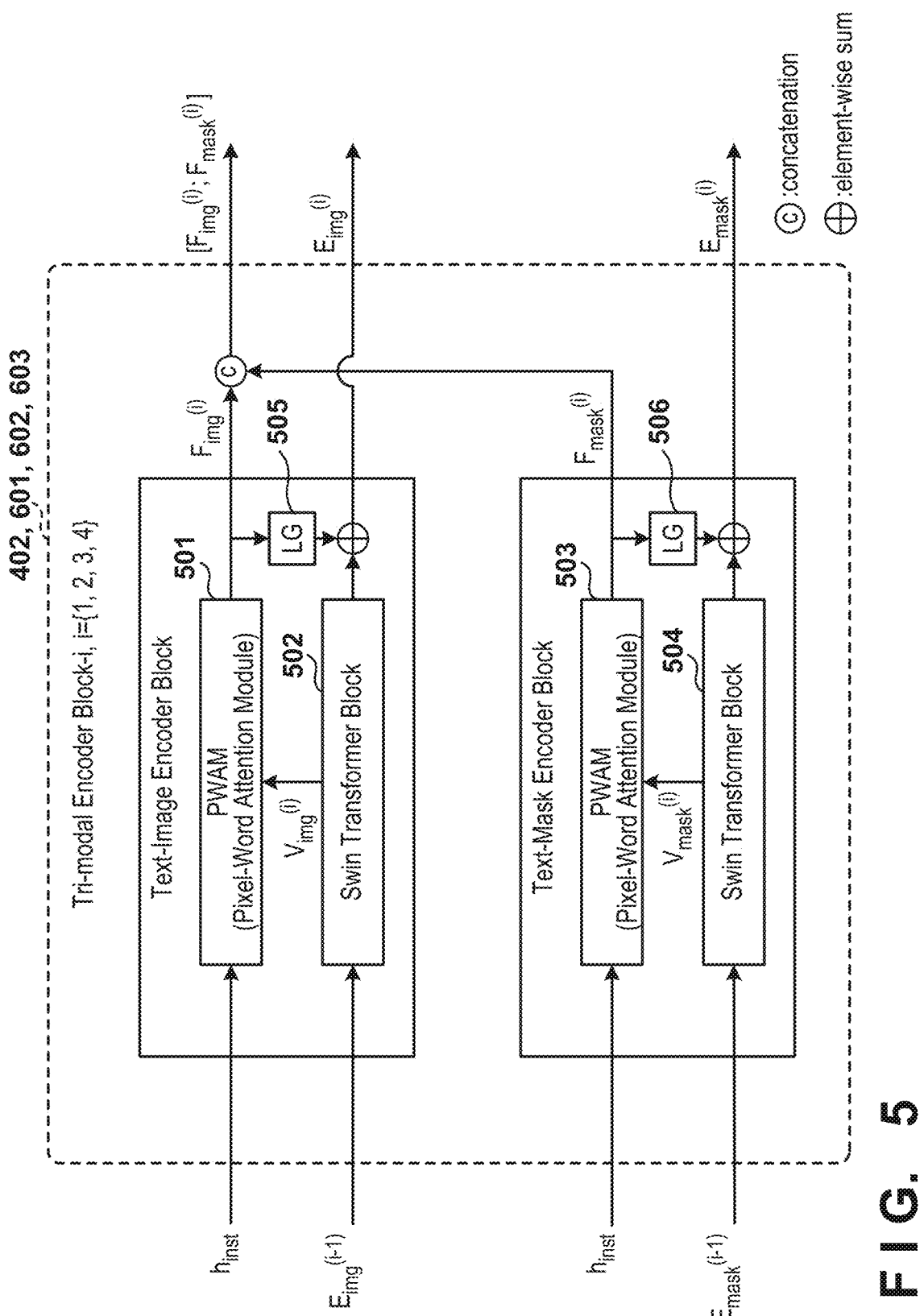
FIG. 5 is a diagram illustrating a configuration example of a tri-modal encoder according to an embodiment.

FIG. 5 illustrates a configuration example of tri-modal encoder blocks 402 and 601 to 603. FIG. 5 illustrates more specific configurations of the text-image encoder block 404 and the text-mask encoder block 405. Note that a case where i=1 corresponds to the tri-modal encoder block 402, and a case where i=4 corresponds to the tri-modal encoder block 603. $E_{img}^{(i-1)}$ corresponds to the captured image, in a case where i=1.

With an attention mechanism, a Pixel-Word Attention Module (PWAM) 501 generates bi-modal features in which the language features $h_{inst}$ are fused with the visual features $V_{img}$. As the PWAM 501, it is possible to use, for example, a known model (Pixel-Word Attention Module) described in "LAVT: Language-Aware Vision Transformer for Referring Image Segmentation" (https://openaccess.thecvf.com/content/CVPR2022/papers/Yang_LAVT_Language-Aware_Vision_Transformer_for_Referring_Image_Segmentation_CVPR_2022_paper.pdf). The PWAM 501 receives an input of the visual features as a query of the attention mechanism and an input of the language features as a key and a value of the attention mechanism.

A Swin transformer block 502 receives an input of an image (or visual features), and extracts the visual features of input information. The Swin transformer block 502 may be, for example, a transformer module described in "Swin Transformer: Hierarchical Vision Transformer using Shifted Windows" (https://openaccess.thecvf.com/content/ICCV2021/papers/Liu_Swin_Transformer_Hierarchical_Vision_Transformer_Using_Shifted_Windows_ICCV_2021_paper.pdf). The Swin transformer block 502 corresponds to a transformer module corresponding to one scale for extracting multi-scale visual features.

A language gate (LG) 505 adjusts the language features so that the language features of an adaptive quantity are merged with the visual features. The LG 505 trains a weighting map for every element of a series of elements of the bi-modal features so that the language features of the adaptive quantity are merged with the visual features. The visual features $V_{img}$ output from the Swin transformer block 502 are merged with (added to) the bi-modal features $F_{img}$ that have been processed by the LG 505, and are output as the visual feature map $E_{img}$.

The text-image encoder block and the text-mask encoder block respectively handle different visual features, but internal module configurations may be common. That is, a PWAM 503, a Swin transformer block 504, and an LG 506 may be modules respectively similar to the PWAM 501, the Swin transformer block 502, and the LG 505.

In this manner, in the present embodiment, the tri-modal features are generated by use of the bi-modal features corresponding to the captured image that has been fused in the PWAM 501 and the bi-modal features corresponding to the mask image that has been fused in the PWAM 503. By configuring in this manner, when predicting a region corresponding to the instruction, it becomes possible to make a prediction in consideration whether it is a region of a road or a region of a vehicle. That is, it becomes possible to select the region corresponding to the instruction from the region of the road and the like that is a stoppable region, and to predict the segmentation mask more appropriately.

A description will be given with reference to FIG. 4 again. A day-night classification branch 406 includes a classification model, and classifies the state of a subject displayed in a captured image, by using the tri-modal features ([$F_{img}$; $F_{mask}$]). The classification of the state of the subject by use of the classification model is performed as a subtask with regard to a main task for predicting the designated region in the image.

In general, the quality of the mask image is likely to be lower in night time zones. For this reason, in the present embodiment, in training a model related to the mask prediction processing, a loss function partially including a loss of the classification model is used. That is, a model related to the mask prediction processing is trained by use of the loss of the classification model that classifies day, night, and the like. Accordingly, under a condition that the quality of the mask image becomes lower (for example, in night time zones), the model can be trained so as not to consider the bi-modal features corresponding to the mask image (or so as to reduce the degree of consideration). In other words, the reliability of an input channel including the mask image can be determined by use of the classification model that classifies the state of the subject. In a case where the reliability of the input channel is low, the degree of consideration of the features can be reduced. Accordingly, for example, degradation in prediction performance due to a time zone can be prevented.

Note that the day-night classification branch 406 may perform a classification task, by using the bi-modal features $F_{mask}$ corresponding to the mask image, instead of using the tri-modal features. Also in this manner, under the condition that the quality of the mask image becomes lower, it can be configured not to consider the bi-modal features corresponding to the mask image.

In addition, in the example illustrated in FIG. 4, a case where the classification model classifies whether it is day or night is described as an example. However, the classification model may be a model that classifies the state of another subject. Regarding the state of the subject, the classification model may classify at least any of whether it is day or night, which time zone, what weather, and whether there is sunshine.

Note that in the present embodiment, an output of the day-night classification branch 406 is used for an arithmetic operation of the loss function on a training stage of the learning model (in training the learning model). However, the output of the day-night classification branch 406 may be used on an inference stage of the learning model (in performing the trained model). For example, the output of the day-night classification branch 406 may be input into the tri-modal encoder blocks 601 to 603 to be fused with the features. Alternatively, the output of the day-night classification branch may be input into the tri-modal decoder blocks 407 and 611 to 613 to be used in decode processing.

The tri-modal decoder block 407 decodes the features that have been encoded by the tri-modal encoder block, and then outputs a region (a predicted segmentation mask 408) on the image corresponding to the place designated by the utterance. The tri-modal decoder block 407 incorporates (concatenates) the tri-modal features into a decode result of a lower layer, decodes in a stepwise manner by using the tri-modal features including the visual features of the mask image, and is capable of generating the predicted segmentation mask 408.

Figure 6:
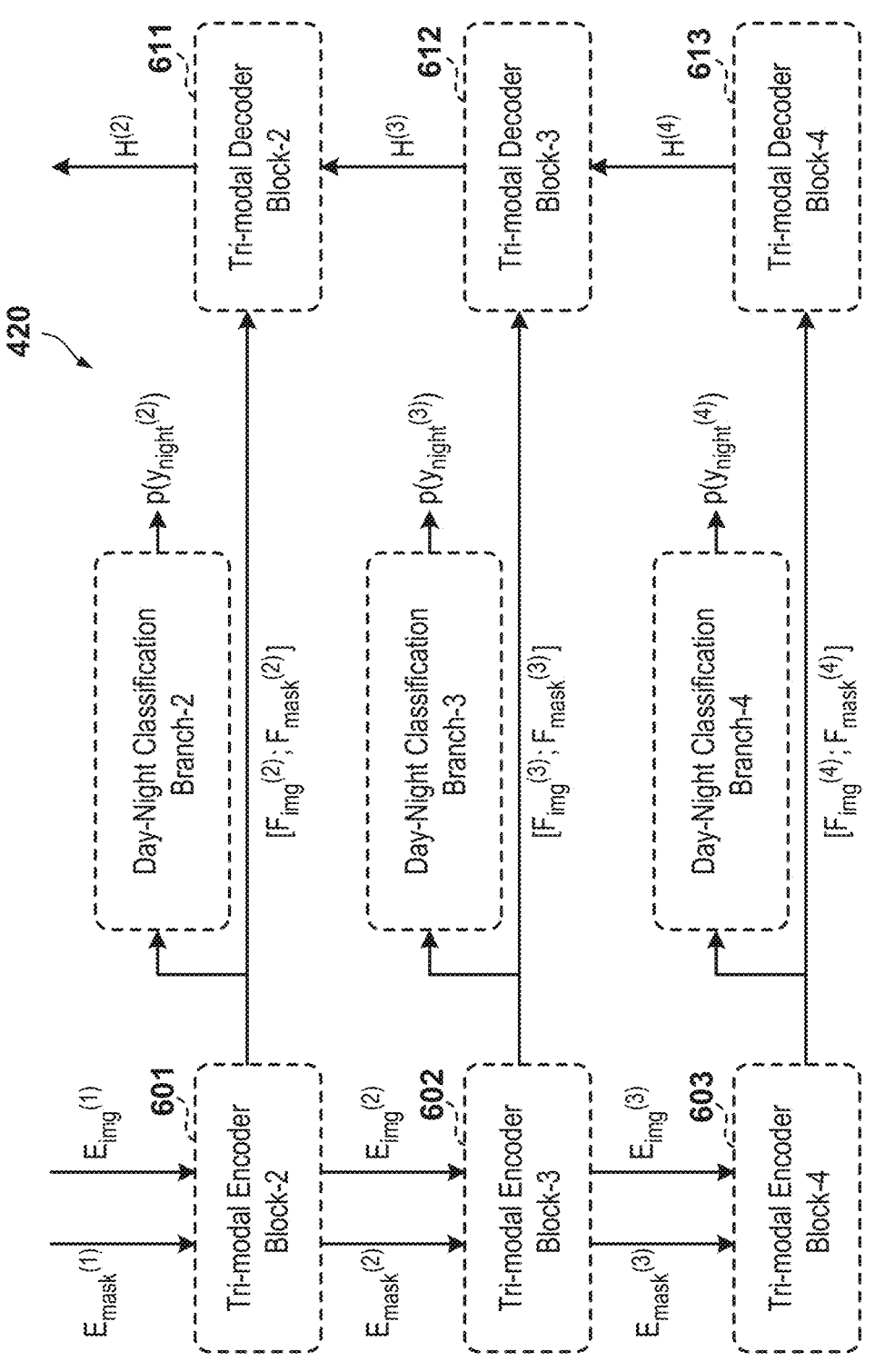
FIG. 6 is a diagram illustrating a configuration example of a hierarchical part of a model according to an embodiment.

FIG. 6 illustrates a detailed configuration example of the multi-layer blocks 420. The multi-layer blocks 420 includes a plurality of tri-modal encoder blocks. As the processing proceeds, the processing moves to a lower layer, and in an example of the present embodiment, the fourth tri-modal encoder block is the block of the final layer. The encoder block in a lower layer handles visual features in which spatial sizes are reduced. Therefore, the spatial size of the tri-modal features output from the encoder block in a lower layer is smaller than the spatial size of the tri-modal features output from the encoder block in an upper layer. By configuring in this manner, it is possible to perform the prediction processing using the tri-modal features of different spatial abstraction degrees. Tri-modal features $[F_{img}^{(i)}; F_{mask}$ $^{(i)}]$ output from the tri-modal encoder of each layer are input into a day-night classification branch provided for every layer, and the day-night classification branch outputs a classification result. However, the model according to the present embodiment is not limited to this example. That is, the spatial size of the tri-modal features output from the encoder block in a lower layer may be the same as or larger than the spatial size of the tri-modal features output from the encoder block in an upper layer.

The tri-modal features $[F_{img}^{(i)}; F_{mask}^{(i)}]$ output from the tri-modal encoder in each layer are also input into a tri-modal decoder block provided for every layer. The tri-modal decoder block incorporates the tri-modal features that have been encoded by the tri-modal encoder block in the same layer into features $H^{(i+1)}$ that have been decoded in a lower layer, and decodes the incorporated features.

Series of Operations of Mask Prediction Processing

Next, a series of operations of the mask prediction processing will be described with reference to FIGS. 7A and 7B. Note that the present processing is achieved as a function of the target region prediction unit 303, by the control unit 130 developing a program stored in the storage device 135 in a memory device of the control unit 130 and executing the program. In addition, the present processing is performed in a state where the learning model for the mask prediction processing that has been described with reference to FIG. 4 and the like has been trained. The present processing is performed, when the moving object 100 acquires utterance text, based on utterance voice including the designation of a place, and in addition, when a captured image including such a place is acquired.

In S701, the target region prediction unit 303 fuses the visual features $V_{img}^{(i)}$ corresponding to the captured image (or $E_{img}^{(i-1)}$) with the language features of the utterance text, in the text image encoder block, and generates bi-modal features $F_{img}^{(i)}$. Note that in a case where the layer of the tri-modal encoder block is the highest layer, i=0 is satisfied and the text image encoder block receives an input of a captured image. In a case where i>0 is satisfied, the text image encoder block receives an input of a visual feature map $E_{img}^{(i-1)}$. Whenever the processing returns to S701, i is incremented.

In S702, the target region prediction unit 303 fuses the visual features $V_{mask}^{(i)}$ corresponding to the mask image (or $E_{mask}^{(i-1)}$) with the language features of the utterance text in the text mask encoder block, and generates the bi-modal features $F_{mask}^{(i)}$.

In S703, the target region prediction unit 303 generates the visual feature map $E_{img}^{(i)}$, based on the bi-modal features $F_{img}^{(i)}$ in the text-image encoder block. For example, in the text-image encoder block, the LG 505 adjusts the language features of the bi-modal features $F_{img}^{(i)}$. Then, the bi-modal features in which the language features that have been adjusted are merged with the visual features $V_{img}^{(i)}$, and a visual feature map $E_{img}^{(i)}$ is generated.

In S704, the target region prediction unit 303 generates a visual feature map $E_{mask}^{(i)}$, based on the bi-modal features $F_{mask}^{(i)}$, in the text-mask encoder block. For example, in the text-mask encoder block, the LG 506 adjusts the language features of the bi-modal features $F_{mask}^{(i)}$. Then, the bi-modal features in which the language features that have been adjusted are merged with the visual features $V_{mask}^{(i)}$, and a visual feature map $E_{mask}^{(i)}$ is generated.

In S705, in the tri-modal encoder, the target region prediction unit 303 combines together the bi-modal features $F_{img}^{(i)}$ and $F_{mask}^{(i)}$, which have been fused, and generates tri-modal features $[F_{img}^{(i)}; F_{mask}^{(i)}]$. In S706, the target region prediction unit 303 performs class classification (for example, day and night classification), by using the tri-modal features $[F_{img}^{(i)}; F_{mask}^{(i)}]$.

In S707, the target region prediction unit 303 determines whether i is the final layer. In a case where the target region prediction unit 303 determines that i is the final layer (for example, the fourth layer illustrated in FIG. 6), the processing proceeds to S708, and in the other cases, the processing returns to S701.

In S708, the target region prediction unit 303 decodes the tri-modal features $[F_{img}^{(4)}; F_{mask}^{(4)}]$ in the tri-modal decoder in the final layer, and generates $H^{(4)}$. Thereafter, the target region prediction unit 303 proceeds the processing to an upper decoder.

In S709, the target region prediction unit 303 combines the tri-modal features $[F_{img}^{(i-1)}; F_{mask}^{(i-1)}]$ with a decode result $H^{(i)}$, in the tri-modal decoder. Note that i is subtracted whenever the processing returns from S711 to S709.

In S710, the target region prediction unit 303 decodes a combination of the tri-modal features $[F_{img}^{(i-1)}; F_{mask}^{(i-1)}]$ and the decode result $H^{(i)}$, in the tri-modal decoder. The decode processing of the tri-modal decoder can be expressed by, for example, Formula (1).

[Formula 1]

$$H^{(i)} = \rho\left(\left[v\left(H^{(i+1)}\right); F_{img}^{(i)}; F_{mask}^{(i)}\right]\right) \qquad (1)$$

Here, v represents up-sampling. ρ represents processing in which, for example, after 3×3 convolution is applied, batch normalization is performed, 3×3 convolution is applied again, and then ReLU is performed.

In S711, the target region prediction unit 303 determines whether i is the highest layer. In a case where the target region prediction unit 303 determines that i is the highest layer, the processing proceeds to S712, and in the other cases, the processing returns to S709.

In S712, the target region prediction unit 303 outputs a region (the predicted segmentation mask 408) on the image corresponding to the designation of the place of the utterance text. The target region prediction unit 303 outputs the predicted segmentation mask, and then the present processing ends.

Series of Operations Related to Training of Learning Model

Next, a series of operations related to training of the learning model will be described with reference to FIG. 8. Note that the present processing is achieved, for example, by one or more processors in an information processing server, which is separate from the moving object 100, developing a program stored in a nonvolatile memory or the like in a memory device of the information processing server and executing the program. In addition, the present processing is performed in a state where the learning model that has been described with reference to FIG. 4 and the like has not been trained. In the present processing, the model is trained by use of a large number of data sets, in which one data set includes utterance text including designation of a place, a captured image for test, and correct data indicating a correct region of a predicted segmentation mask on the captured image. The data sets can be stored in, for example, a database included in the information processing server.

In S801, the processor of the information processing server performs mask prediction processing (processing similar to S701 to S712 described in FIGS. 7A and 7B) using initial parameters. In S802, the processor of the information processing server acquires the location of the predicted segmentation mask and the class classification result that have been obtained in the mask prediction processing.

In S803, the processor of the information processing server calculates a loss function, based on a difference between the correct data, the location of the predicted segmentation mask, and the class classification result. The loss function includes a first loss using an output of the decoder (the location of the predicted segmentation mask) and a correct answer indicating the region of the segmentation mask on the captured image, and a second loss using the classification result by the day-night classification model and the correct answer indicating the state of a subject (for example, day or night). Note that the function constituting the second loss will be also referred to as an auxiliary loss function.

In S804, the processor of the information processing server updates the weighting parameters of the neural network included in the learning model so as to decrease the value of the loss function. In S805, the processor of the information processing server determines whether an end condition of training is satisfied. In a case where it is determined that the end condition is satisfied, the processor ends the present processing. In the other cases, the processor returns the processing to S802. For example, the processor of the information processing server is capable of determining whether the end condition is satisfied such that the value of the loss function converges to a value lower than a predetermined value and the number of trials that have been done is larger than a predetermined number of epochs.

The information processing server transmits the parameters of the learning model (for example, the weighting parameters of the neural network or the like) that has been obtained by the training to the moving object 100 through a network, for example. By configuring in this manner, the moving object 100 is capable of performing the above-described mask prediction processing using the trained learning model.

As described heretofore, one or more trained machine learning models include an encoder that receives inputs of utterance text including designation of a place, a first image that has been captured by the image capturing apparatus and that includes a place, and a second image obtained by dividing a region for every identical object in the first image. In this situation, the encoder generates the bi-modal features $(F_{mask}, F_{img})$ corresponding to each image in which the language features of the utterance text are fused with the visual features of each image by using the attention mechanism, and outputs the tri-modal features $([F_{img}; F_{mask}])$ in which the bi-modal features that have been generated are combined together. In addition, one or more trained machine learning models include a decoder that outputs a region (408) on the first image corresponding to the designation of the place of the utterance text, by using the tri-modal features. By configuring in this manner, it becomes possible to appropriately identify the place that is included in an image and that is related to utterance.

Note that in the above-described embodiments, the model using the three modal features of the image, the segmentation, and the text has been described as an example. However, the model according to the present embodiment may use another piece of information. For example, the model may handle features of environmental information (for example, a value acquired from a sensor included in the vehicle) as an input. In other words, without being limited to only the tri-modal features of the image, the segmentation, and the text, multi-modal features in which the environmental information is added (quadra-modal or higher) may be handled. In addition, from the viewpoint of training, in a case where a part of the environmental information is input, a coefficient of an auxiliary loss term of the environmental information used for the input can be set to 0 (for example, in a case where only sunshine can be input, a sunshine auxiliary loss term can be set to 0).

Note that regarding a case where the output of the day-night classification branch is handled as an input into another block such as a tri-modal decoder block, for example, when performing processing on an inference stage by using a model that has been trained by use of an auxiliary loss function of day and night, the sunshine amount that has been acquired from a sensor or the like provided in the vehicle may be converted into $p(y_{night})$ (for example, calculated in accordance with a conversion function such that $p(y_{night})$ becomes lower as the sunshine amount is larger), and such $p(y_{night})$ may be handled as an input into another block.

Note that the above-described machine learning model may be performed by an information processing apparatus in various modes. For example, the information processing apparatus may be the moving object 100, or may be configured to be incorporated into the moving object 100 (that is, may be the control unit 130). In addition, the information processing apparatus may be an information processing server that acquires an image and voice that have been acquired by the moving object 100 and that performs the above machine learning model. Further, a computer program for operating the above-described machine learning model may be a computer program for causing one or more computers to function as each unit of the information processing apparatus.

Summary of Embodiments

1. An information processing apparatus in the above mentioned embodiments, comprises
    at least one processor configured to perform at least one trained machine learning model, wherein
    the at least one trained machine learning model includes:
        an encoder (for example, 402) configured to receive inputs of text information including designation of a place, a first image that is an image captured by an image capturing apparatus and that includes the place, and a second image obtained by dividing a region for every identical object in the first image, and configured to output tri-modal features (for example, $[F_{img}; F_{mask}]$) that have been generated to include visual features of the first image that has been captured, visual features of the second image obtained by dividing the region, and language features of the text information; and
        a decoder configured to output a region (for example, 408) on the first image corresponding to the designation of the place in the text information, by using the tri-modal features.
    According to this embodiment, when predicting a region corresponding to an instruction, it becomes possible to make a prediction in consideration of a region, such as whether it is a region of a road or a region of a vehicle. That is, it becomes possible to appropriately identify a place that is included in an image and that is related to utterance.

2. In the information processing apparatus of the above mentioned embodiments,
    the encoder includes a first encoder block (for example, a text image encoder block) and a second encoder block (for example, a text mask encoder block), the first encoder block being configured to output bi-modal features corresponding to the first image, the bi-modal features being obtained by fusing the language features of the text information into the visual features of the first image by use of an attention mechanism, the second encoder block being configured to output bi-modal features corresponding to the second image, the bi-modal features being obtained by fusing the language features of the text information into the visual features of the second image by use of an attention mechanism; and
    the encoder either concatenates or adds the bi-modal features corresponding to the first image and the bi-modal features corresponding to the second image, and outputs the tri-modal features.
    According to this embodiment, it becomes possible to appropriately fuse the language features with the visual features of each the captured image and the mask image by using the attention mechanism, and to generate the tri-modal features easily.

3. In the information processing apparatus of the above mentioned embodiments, the encoder further outputs a visual feature map (for example, $E_{img}$) in which the bi-modal features (for example, $F_{img}$) corresponding to the first image are merged with the visual features (for example, $V_{img}$) of the first image, and a visual feature map (for example, $E_{mask}$) in which the bi-modal features (for example, $F_{mask}$) corresponding to the second image are merged with the visual features (for example, $V_{mask}$) of the second image.
    According to this embodiment, the features in which the language features are appropriately merged with the visual features of each image can be generated.

4. In the information processing apparatus of the above mentioned embodiments, the encoder includes:
    a first layer encoder configured to output the tri-modal features (for example, $[F_{img}, F_{mask}]$), the visual feature map ($E_{img}$) related to the first image, and the visual feature map (for example, $E_{mask}$) related to the second image; and
    a second layer encoder configured to generate bi-modal features in which the visual feature maps that have been input from the first layer encoder and the language features of the text information are respectively fused, and configured to output tri-modal features in which the bi-modal features that have been generated are combined together.
    According to this embodiment, prediction processing using the tri-modal features generated in a stepwise manner can be performed.

5. In the information processing apparatus of the above mentioned embodiments, a spatial size of the tri-modal features output from the second layer encoder is smaller than a spatial size of the tri-modal features output from the first layer encoder.
    According to this embodiment, prediction processing using tri-modal features of different spatial abstraction degrees can be performed.

6. In the information processing apparatus of the above mentioned embodiments, the decoder includes:

a second layer decoder configured to decode by using the tri-modal features output from the second layer encoder; and a first layer decoder configured to decode features in which the tri-modal features output from the first layer encoder are incorporated into the features decoded by the second layer decoder.

According to this embodiment, the predicted segmentation mask 408 can be generated by decoding in a stepwise manner by use of the tri-modal features including the visual features of the mask image.

7. In the information processing apparatus of the above mentioned embodiments, the information processing apparatus further comprises a classification model (for example, 406) configured to classify a state of a subject displayed in the first image as a subtask, by using the tri-modal features.

According to this embodiment, the reliability of the input channel including the mask image can be determined by use of the classification model that classifies the state of the subject. In a case where the reliability of the input channel is low, the degree of consideration of the features can be reduced.

8. In the information processing apparatus of the above mentioned embodiments, the information processing apparatus further comprises a classification model (for example, 406) configured to classify a state of a subject displayed in the first image as a subtask, by using the bi-modal features (for example, $F_{mask}$) corresponding to the second image.

According to this embodiment, the reliability of the input channel including the mask image can be determined by use of the classification model that classifies the state of the subject. In a case where the reliability of the input channel is low, the degree of consideration of the features can be reduced.

9. In the information processing apparatus of the above mentioned embodiments, the information processing apparatus further comprises a classification model configured to classify a state of a subject displayed in the first image as a subtask, by using the tri-modal features generated by the second layer encoder.

According to this embodiment, the reliability of the input channel including the mask image can be determined, based on the tri-modal features generated in a stepwise manner. In a case where the reliability of the input channel is low, the degree of consideration of the features can be reduced.

10. In the information processing apparatus of the above mentioned embodiments, the information processing apparatus further comprises a classification model configured to classify a state of a subject displayed in the first image as a subtask, by using the bi-modal features (for example, $F_{mask}$) generated by the second layer encoder.

According to this embodiment, the reliability of the input channel including the mask image can be determined, based on the bi-modal features generated in a stepwise manner. In a case where the reliability of the input channel is low, the degree of consideration of the features can be reduced.

11. In the information processing apparatus of the above mentioned embodiments, the classification model is configured to classify the state of the subject classifies at least any of whether the state of the subject is day or night, which time zone, what weather, and whether there is sunshine.

According to this embodiment, the state of the subject can be determined, under the condition that the reliability of the mask image is likely to become lower in accordance with day or night, a time zone, or the like.

12. In the information processing apparatus of the above mentioned embodiments, the encoder performs processing by using a language gate on the bi-modal features (for example, $F_{mask}$) corresponding to the second image, adds the visual features (for example, $V_{mask}$) of the second image, and outputs the visual feature map (for example, $E_{mask}$) related to the second image (for example, S704).

According to this embodiment, the language features can be adjusted so that the language features of an adaptive quantity are merged with the visual features of the mask image.

13. In the information processing apparatus of the above mentioned embodiments, the visual features of the first image are generated by inputting the first image into a transformer corresponding to the first image, and the visual features of the second image are generated by inputting the second image into a transformer corresponding to the second image.

According to this embodiment, by respectively applying the transformer to the captured image and the mask image, the respective highly accurate visual features are obtainable.

14. In the information processing apparatus of the above mentioned embodiments, the text information includes either utterance by voice or text that has been input.

According to this embodiment, it is possible to use utterance voice of a user or text that has been input by the user.

15. A learning method in the above mentioned embodiments, performed by an information processing apparatus for training at least one machine learning model to generate at least one trained machine learning model, wherein the at least one machine learning model each includes a neural network, and the at least one machine learning model includes:

an encoder configured to receive inputs of text information including designation of a place, a first image that is an image captured by an image capturing apparatus and that includes the place, and a second image obtained by dividing a region for every identical object in the first image, configured to generate bi-modal features (for example, $F_{mask}$, $F_{img}$) corresponding to each image in which language features of the text information are fused with visual features of each image by use of an attention mechanism, and configured to output tri-modal features (for example, $[F_{img}; F_{mask}]$) in which the bi-modal features that have been generated are combined together; and a decoder configured to output a region on the first image corresponding to the designation of the place in the text information, by using either the tri-modal features or the bi-modal features corresponding to each image, the learning method comprises changing a weighting parameter of the neural network to reduce a value of a loss function using a loss with use of an output from the decoder and a correct answer indicating the region on the first image.

According to this embodiment, it is possible to train the machine learning model including an encoder that extracts the tri-modal features and a decoder that outputs a region on an image corresponding to the designation of a place from the extracted features.

16. In the learning method of the above mentioned embodiments, the at least one machine learning model further includes a classification model configured to classify a state of a subject displayed in the first image as a subtask, by using either features including the visual features of the second image or the tri-modal features, the learning method further comprising changing the weighting parameter of the neural network to reduce the value of the loss function using the loss with use of the output from the decoder and the correct answer indicating the region on the first image, and a loss with use of an output from the classification model and a correct answer indicating the state of the subject.

According to this embodiment, under the condition that the quality of the mask image becomes lower (for example, in night time zones), the model can be trained so as not to consider the bi-modal features corresponding to the mask image (or so as to reduce the degree of consideration). In other words, the reliability of the input channel including the mask image can be determined by use of the classification model that classifies the state of the subject. In a case where the reliability of the input channel is low, the learning model that reduces the degree of consideration of the features can be generated.

The invention is not limited to the foregoing embodiments, and various variations/changes are possible within the spirit of the invention.

What is claimed is:

1. An information processing apparatus comprising at least one processor configured to perform at least one trained machine learning model, wherein the at least one trained machine learning model includes:

an encoder configured to receive inputs of text information including designation of a place, a first image that is an image captured by an image capturing apparatus and that includes the place, and a second image obtained by dividing a region for every identical object in the first image, and configured to output tri-modal features that have been generated to include visual features of the first image that has been captured, visual features of the second image obtained by dividing the region, and language features of the text information; and a decoder configured to output a region on the first image corresponding to the designation of the place in the text information, by using the tri-modal features.

2. The information processing apparatus according to claim 1, wherein the encoder includes a first encoder block and a second encoder block, the first encoder block being configured to output bi-modal features corresponding to the first image, the bi-modal features being obtained by fusing the language features of the text information into the visual features of the first image by use of an attention mechanism, the second encoder block being configured to output bi-modal features corresponding to the second image, the bi-modal features being obtained by fusing the language features of the text information into the visual features of the second image by use of an attention mechanism; and the encoder either concatenates or adds the bi-modal features corresponding to the first image and the bi-modal features corresponding to the second image, and outputs the tri-modal features.

3. The information processing apparatus according to claim 2, wherein the encoder further outputs a visual feature map in which the bi-modal features corresponding to the first image are merged with the visual features of the first image, and a visual feature map in which the bi-modal features corresponding to the second image are merged with the visual features of the second image.

4. The information processing apparatus according to claim 3, wherein the encoder includes:

a first layer encoder configured to output the tri-modal features, the visual feature map related to the first image, and the visual feature map related to the second image; and a second layer encoder configured to generate bi-modal features in which the visual feature maps that have been input from the first layer encoder and the language features of the text information are respectively fused, and configured to output tri-modal features in which the bi-modal features that have been generated are combined together.

5. The information processing apparatus according to claim 4, wherein a spatial size of the tri-modal features output from the second layer encoder is smaller than a spatial size of the tri-modal features output from the first layer encoder.

6. The information processing apparatus according to claim 5, wherein the decoder includes:

a second layer decoder configured to decode by using the tri-modal features output from the second layer encoder; and a first layer decoder configured to decode features in which the tri-modal features output from the first layer encoder are incorporated into the features decoded by the second layer decoder.

7. The information processing apparatus according to claim 1, further comprising a classification model configured to classify a state of a subject displayed in the first image as a subtask, by using the tri-modal features.

8. The information processing apparatus according to claim 2, further comprising a classification model configured to classify a state of a subject displayed in the first image as a subtask, by using the bi-modal features corresponding to the second image.

9. The information processing apparatus according to claim 4, further comprising a classification model configured to classify a state of a subject displayed in the first image as a subtask, by using the tri-modal features generated by the second layer encoder.

10. The information processing apparatus according to claim 4, further comprising a classification model configured to classify a state of a subject displayed in the first image as a subtask, by using the bi-modal features generated by the second layer encoder.

11. The information processing apparatus according to claim 7, wherein the classification model configured to classify the state of the subject classifies at least any of whether the state of the subject is day or night, which time zone, what weather, and whether there is sunshine.

12. The information processing apparatus according to claim 3, wherein the encoder performs processing by using a language gate on the bi-modal features corresponding to the second image, adds the visual features of the second image, and outputs the visual feature map related to the second image.

13. The information processing apparatus according to claim 1, wherein the visual features of the first image are generated by inputting the first image into a transformer corresponding to the first image, and the visual features of the second image are generated by inputting the second image into a transformer corresponding to the second image.

14. The information processing apparatus according to claim 1, wherein the text information includes either utterance by voice or text that has been input.

15. A learning method performed by an information processing apparatus for training at least one machine learning model to generate at least one trained machine learning model, wherein the at least one machine learning model each includes a neural network, and the at least one machine learning model includes:

an encoder configured to receive inputs of text information including designation of a place, a first image that is an image captured by an image capturing apparatus and that includes the place, and a second image obtained by dividing a region for every identical object in the first image, configured to generate bi-modal features corresponding to each image in which language features of the text information are fused with visual features of each image by use of an attention mechanism, and configured to output tri-modal features in which the bi-modal features that have been generated are combined together; and a decoder configured to output a region on the first image corresponding to the designation of the place in the text information, by using either the tri-modal features or the bi-modal features corresponding to each image, the learning method comprising changing a weighting parameter of the neural network to reduce a value of a loss function using a loss with use of an output from the decoder and a correct answer indicating the region on the first image.

16. The learning method according to claim 15, wherein the at least one machine learning model further includes a classification model configured to classify a state of a subject displayed in the first image as a subtask, by using either features including the visual features of the second image or the tri-modal features, the learning method further comprising changing the weighting parameter of the neural network to reduce the value of the loss function using the loss with use of the output from the decoder and the correct answer indicating the region on the first image, and a loss with use of an output from the classification model and a correct answer indicating the state of the subject.

17. A moving object comprising:

an image capturing apparatus;

an acquisition unit configured to acquire text information; and at least one processor configured to perform processing of at least one trained machine learning model, wherein the at least one trained machine learning model includes:

an encoder configured to receive inputs of text information including designation of a place, a first image that is an image captured by the image capturing apparatus and that includes the place, and a second image obtained by dividing a region for every identical object in the first image, and configured to output tri-modal features that have been generated to include visual features of the first image that has been captured, visual features of the second image obtained by dividing the region, and language features of the text information; and a decoder configured to output a region on the first image corresponding to the designation of the place in the text information, by using the tri-modal features.

18. An information processing method performed by an information processing apparatus for performing at least one trained machine learning model, the information processing method comprising:

receiving inputs of text information including designation of a place, a first image that is an image captured by an image capturing apparatus and that includes the place, and a second image obtained by dividing a region for every identical object in the first image, and encoding tri-modal features that have been generated to include visual features of the first image that has been captured, visual features of the second image obtained by dividing the region, and language features of the text information; and decoding a region on the first image corresponding to the designation of the place in the text information, by using the tri-modal features.

* * * * *